United States Patent
Hsu et al.

(10) Patent No.: US 6,854,027 B2
(45) Date of Patent: Feb. 8, 2005

(54) HARD DISK DEVICE CAPABLE OF DETECTING CHANNELS OF A HOST TO WHICH HARD DISK CONTROLLERS BELONG

(75) Inventors: Ching Hao Hsu, Hsinchu (TW); Yu Hsiang Hsieh, Kaohsiung (TW)

(73) Assignee: Promise Technology, Inc., Hsinchu (TW)

( * ) Notice: Subject to any disclaimer, the term of this patent is extended or adjusted under 35 U.S.C. 154(b) by 56 days.

(21) Appl. No.: 10/603,822

(22) Filed: Jun. 26, 2003

(65) Prior Publication Data

US 2004/0267976 A1 Dec. 30, 2004

(51) Int. Cl.⁷ .............................................. G06F 3/12
(52) U.S. Cl. .............................................. 710/74; 710/15
(58) Field of Search .................... 710/74, 72, 313, 710/8–10, 15

(56) References Cited

U.S. PATENT DOCUMENTS

| | | | | |
|---|---|---|---|---|
| 6,781,826 B1 * | 8/2004 | Goldstone et al. | .......... | 361/685 |
| 6,791,779 B1 * | 9/2004 | Singh et al. | .................. | 360/55 |
| 2003/0093586 A1 * | 5/2003 | Sumiyoshi et al. | ............ | 710/1 |
| 2004/0117522 A1 * | 6/2004 | Loffink et al. | ................ | 710/74 |
| 2004/0177182 A1 * | 9/2004 | Metevier et al. | ............ | 710/100 |

* cited by examiner

*Primary Examiner*—Kim Huynh
(74) *Attorney, Agent, or Firm*—Rosenberg, Klein & Lee

(57) ABSTRACT

A hard disk device capable of detecting channels of a host to which hard disk controllers belong and are used to detect the connection relations between several channels of a host and several removable hard disk cases in the hard disk device. Each of the removable hard disk cases has a current sensor for detecting the current variation of the hard disk, transforming the variation into a voltage signal, and transmitting the voltage signal to a enclosure-controller. The enclosure-controller then converts the voltage signal into a flag. The host can read the flag via a serial bus to build the corresponding relation between the channel connected to the hard disk and the enclosure-controller. The effects of easy use and friendly operation can thus be accomplished.

6 Claims, 3 Drawing Sheets

HARD DISK DEVICE CAPABLE OF DETECTING CHANNELS OF A HOST TO WHICH HARD DISK CONTROLLERS BELONG

FIELD OF THE INVENTION

The present invention relates to a hard disk device capable of detecting channels of a host to which hard disk controllers belong and, more particularly, to a hard disk device, which compares current variation when a hard disk idles or operates to let a hard disk controller trigger a flag so as to build the corresponding relations between channels of a host and the hard disk controllers according to the flag.

BACKGROUND OF THE INVENTION

A removable hard disk case generally includes a hard disk, a fan, a detection circuit and a enclosure-control chip. The detection circuit is used to detect the temperature, the fan's rotation speed and the voltage. The enclosure-control chip is used to collect environmental parameters and transmit them back to a host controller. A removable hard disk case of the conventional ATA (also called IDE) interface is generally connected to the host controller via a parallel ATA (PATA) bus. Using the PATA as the transmission interface, the enclosure-control chip in the removable hard disk case can transmit environmental parameters back to the host controller. The host controller also controls the enclosure-control chip in the removable hard disk case and transmits data to the hard disk via the PATA. An LED lamp is also directly connected to the enclosure-control chip in the removable hard disk case to flash when the hard disk malfunctions or is active.

Nowadays, the ATA interface evolves from parallel bus to serial bus, wherein two pairs of 1.5 GHz cables are used to transmit data at a higher speed. However, because the speed is as high as 1.5 GHz, if other external components are connected, there will be a problem of signal attenuation. Therefore, the 1.5 GHz cable can hardly be connected externally to other enclosure-control chips, or even the 1.5 GHz cable can be connected externally to other enclosure-control chips, the cost will be high. Generally, a channel of a host is connected to the hard disk via the serial ATA (SATA). The host controller is additionally connected to the LED lamp and the enclosure-control chip. However, the corresponding relation between the channel of the host and the enclosure-control chip disappears. That is, the corresponding relation between the hard disk connected to the channel and the LED lamp disappears. This will derives the following problem. When one hard disk malfunctions, the user cannot determine the hard disk corresponding to the flashing lamp. For instance, if a host controller has four serial ATA channels and can connect four hard disks, each accompanying a enclosure-control chip. Each of the enclosure-control chips has its ID. The host controller is series connected with the four enclosure-control chips via I2C interface. When the host controller finds that the hard disk of channel 1 malfunctions, it needs to let the LED lamp corresponding to channel 1 flash to notify the user to replace the hard disk. However, because the corresponding between the channel of the host and the enclosure-control chip disappears, unless the software has the capability of detecting the corresponding between the channel of the host and the ID of the enclosure-control chip, one can only assume the external wiring is the same as in the program. For instance, the program fixes the ID of the enclosure-control chip connected with channel 1 to 1, when the system performs the setting, the user must connect the cable of channel 1 to the removable hard disk case with ID 1 manually. However, manual assignment of ID easily connects wrong enclosure-control chips, resulting in the problems of incorrect flashing light and incorrect removal of hard disk.

Accordingly, the present invention aims to propose a hard disk device capable of detecting channels of a host to which hard disk controllers belong so as to build the corresponding relations between the channels of the host and the hard disk controllers.

SUMMARY OF THE INVENTION

The primary object of the present invention is to provide a hard disk device capable of detecting channels of a host to which hard disk controllers belong, which compare the current variation when a hard disk idles or operates to build the corresponding relations between channels of the host and enclosure-controllers of several hard disks, thereby solving the problems of incorrect flashing light and incorrect removal of hard disk in the prior art due to ignorance of the relation between the channels and the enclosure-controllers.

Another object of the present invention is to provide a hard disk device capable of detecting channels of a host to which hard disk controllers belong, which abandon manual assignment of IDs of enclosure-controllers of hard disks in the prior art to accomplish the effects of easy use and friendly operation.

Yet another object of the present invention is to provide a hard disk device capable of detecting channels of a host to which hard disk controllers belong so as to have the advantage of a lower price.

To achieve the above objects, a hard disk device capable of detecting channels of a host to which hard disk controllers belong of the present invention comprises at least two hard disks, at least two enclosure-controllers, at least two current sensors and at least two serial buses. The two hard disks are used to store data and connected to a plurality of channels of a host. Each of the two enclosure-controllers is connected to one of the hard disks, and is used to control LEDs and collect environmental parameters and accomplish interactive relationship of information transmission with the host. Each of the two current sensors is connected to one of the hard disks and one of the enclosure-controllers, and is used to detect current variation of the hard disk, transform the variation into a voltage signal, and transmit the voltage signal to the enclosure-controller. Each of the serial buses is connected to one of the enclosure-controllers, and provides connection with the host for processing communication protocols and data transmission of connection interface. The host can thus read the flags triggered by the enclosure-controllers via the serial buses to build the corresponding relations between the channels and the enclosure-controllers.

The various objects and advantages of the present invention will be more readily understood from the following detailed description when read in conjunction with the appended drawing, in which:

DETAILED DESCRIPTION OF THE PREFERRED EMBODIMENTS

The present invention detects the current variations when hard disks idle and operate to let enclosure-controllers generate flags so that the host can build the corresponding relations between several channels and several enclosure-controllers of hard disks, thereby detecting the channels of the host to which the enclosure-controllers of the hard disks belong.

Figure 1:
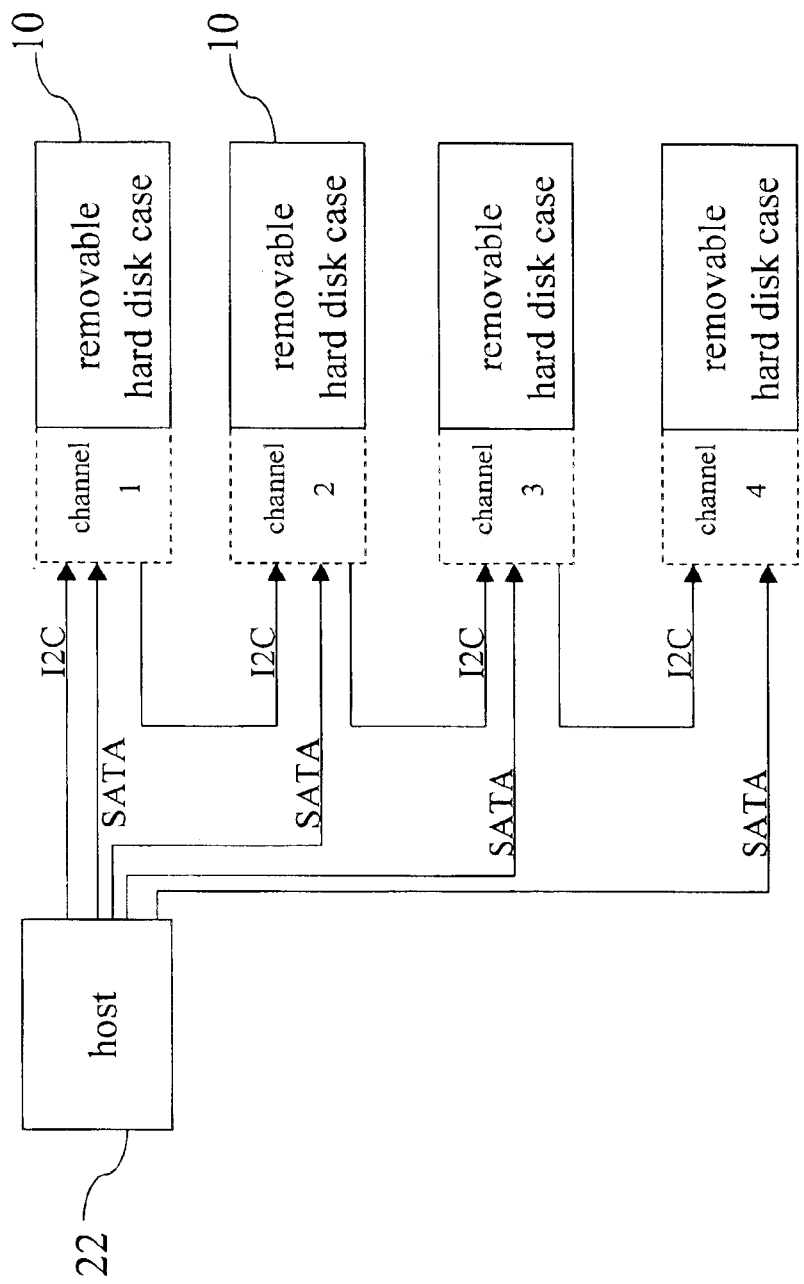
FIG. 1 is an architecture diagram of the hard disk device of the present invention.

As shown in FIG. 1, a hard disk device of the present invention comprises four removable hard disk cases 10. A host 22 has four serial ATA (SATA) channels, respectively being channel 1, channel 2, channel 3 and channel 4. The host 22 is connected to hard disks in the four removable hard disk cases 10 via these four SATA channels. Enclosure-controllers in the removable hard disk cases are connected to the host 22 not via the above channels but via the I2C serial bus.

Each device connected to the I2C serial bus needs to have a unique address to avoid conflict with other devices. Therefore, it is necessary to discriminate the I2C address to which each of the removable hard disk cases 10 belongs. This I2C address is called an ID hereinafter.

Figure 2:
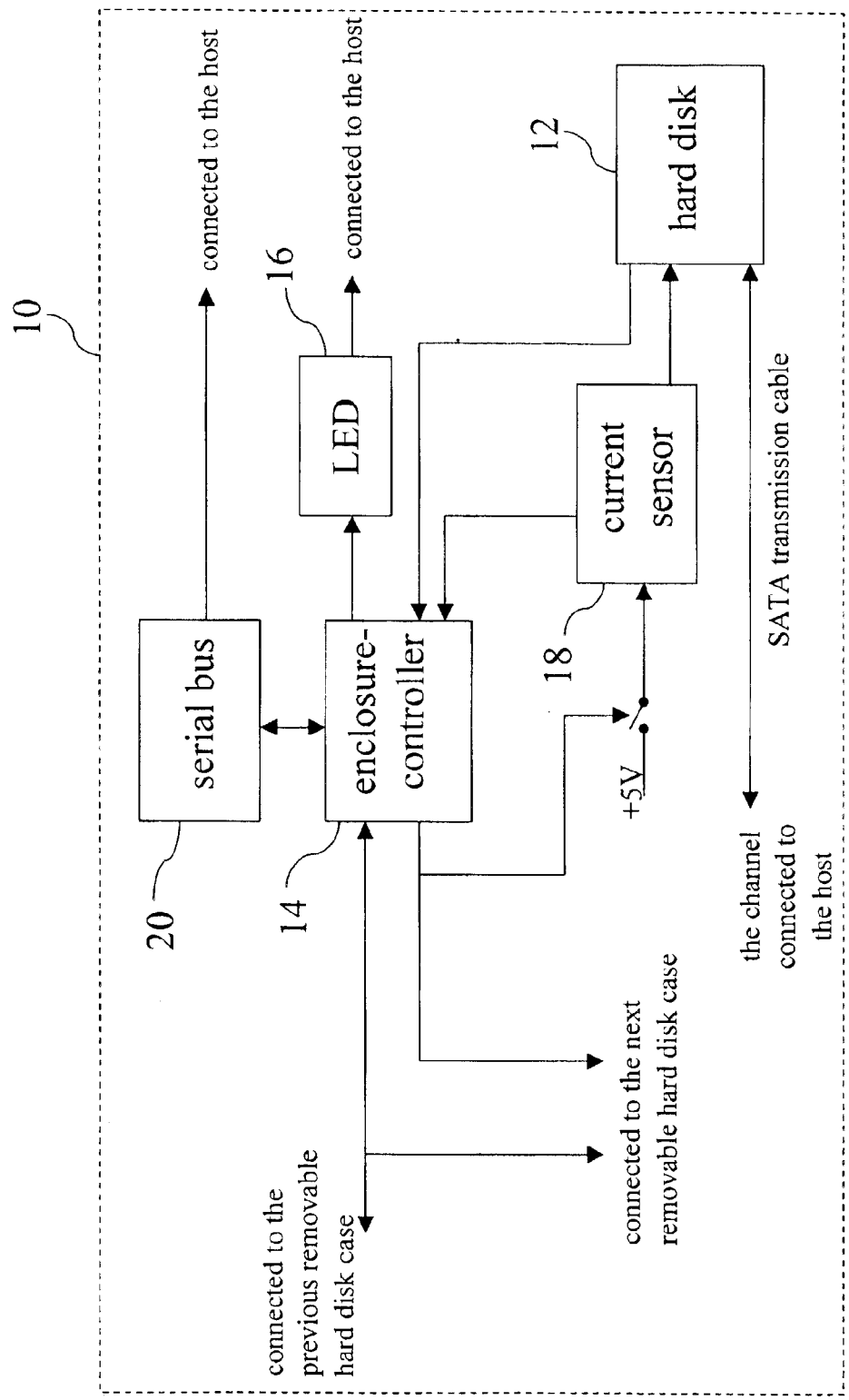
FIG. 2 is a structure block diagram of each removable hard disk case of the hard disk device of the present invention.

As shown in FIG. 2, the removable hard disk case 10 comprises a hard disk 12 and its read/write head (not shown) for data storage. The hard disk 2 is connected to a channel of the host via an SATA cable. The hard disk 12 is connected with a enclosure-controller 14, which has an ID and is used to collect environmental parameters like temperature, voltage and indication lights. The enclosure-controller 14 is also used to accomplish interactive relation of information transmission with the host. The enclosure-controller 14 is connected to an indication lamp, usually being an LED lamp 16. When the host finds that the hard disk malfunctions, it will notify the enclosure-controller 14 to control the LED lamp to flash for alarm. A current sensor 18 is provided between the hard disk 12 and the enclosure-controller 14, and is used to detect the current variation of the hard disk 12, transform the variation into a voltage signal and transmit the voltage signal to the enclosure-controller 14. The enclosure-controller 14 then compares the voltage signal with a voltage threshold to generate a flag. A serial bus 20 is connected to the enclosure-controller 14, and is also connected to the host for processing communication protocols and data transmission of connection interface. The host can thus accomplish interaction of data transmission with the enclosure-controller 14 via the serial bus 20 to read the flag triggered by the enclosure-controller 14 and build the corresponding relation between the channel connected to the hard disk 12 and the enclosure-controller 14 based on the flag.

Because the removable hard disk case 10 makes use of a simple architecture to detect channels of a host to which hard disk controllers belong, the removable hard disk case 10 of the present invention has the advantage of a cheap price.

Figure 3:
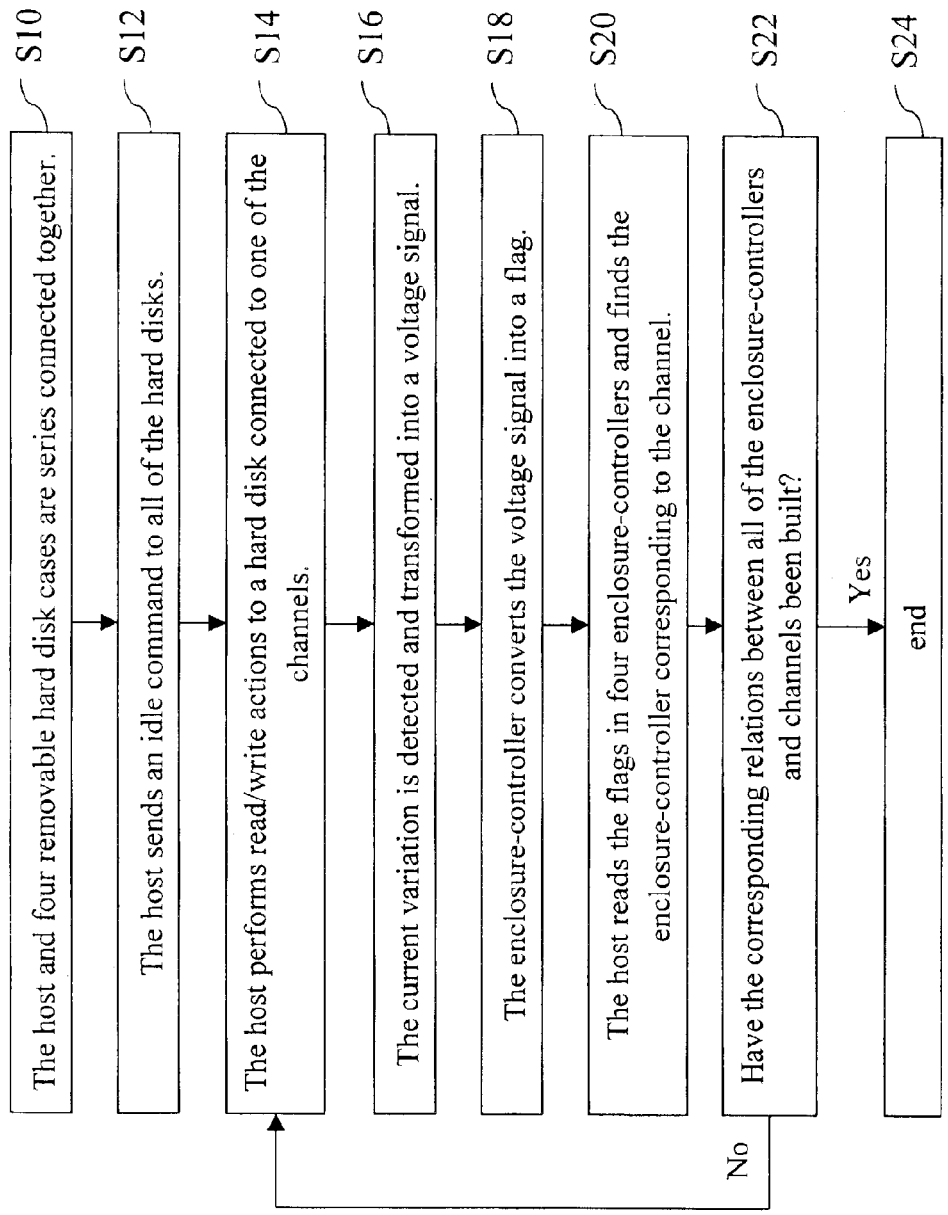
FIG. 3 is a flowchart of building the corresponding relations between channels of a host and enclosure-controllers of the present invention.

FIG. 3 is a flowchart of building the corresponding relations of channels of a host and enclosure-controllers of the present invention. As shown in FIG. 3, first, the host 22 and the four removable hard disk cases 10 are series connected together (Step S10). The host 22 is series connected with the four enclosure-controllers 14 via an I2C serial bus, and the channels of the host 22 and the hard disks 12 are randomly connected. Next, the host 22 sends an idle command to all the hard disks 12 to let them idle (Step S12). The host 22 then performs read/write actions to the hard disk 12 connected to channel 1 to let the hard disk 12 generate current variation (Step S14). The current sensor 18 connected to the hard disk 12 detects the current variation, transforms the variation into a voltage signal and transmits the voltage signal to the enclosure-controller 14 connected therewith (Step S16). The enclosure-controller 14 compares the voltage signal variation when the hard disk 12 idles and operates and converts the variation into a flag (Step S18).

Subsequently, the host 22 reads the flag in the four enclosure-controllers 14 to build the corresponding relation between channel 1 and one of the enclosure-controllers based on the flag. (Step S20). For instance, when the flag in one of the enclosure-controllers 14 is read to be 1, meaning that the ID of the enclosure-controller 14 corresponds to channel 1. Next, whether the corresponding relations between all the enclosure-controllers 14 and channels have been built is determined (Step S22). If the answer is yes, the whole process of building the corresponding relation is stopped (Step S24); otherwise, Step S14 is continued, and the host 22 performs read/write actions to the hard disk 12 connected to channel 2 to let the hard disk 12 generate current variation. The above Steps S14 to S20 are repeated until the corresponding relations between the channels of the host 22 and all the enclosure-controllers 13 are built.

After the corresponding relations of the channels of the host and the enclosure-controllers have been built, when the host 22 finds that one of the hard disks 12 malfunctions via the serial bus 20, it can immediately know the enclosure-controller 14 to which the abnormal hard disk 12 belongs through the previously built corresponding relations between the channels and the enclosure-controllers 14, and can immediately notify the enclosure-controller 14 to issue a command to let the LED lamp 16 connected therewith flash, hence informing the user to replace the hard disk 12.

When the host 22 issues a read/write command to the hard disk 12 of each of the removable hard disk cases 10 through software using the above method for setting an ID, the current sensor 18 stores the current variation of the hard disk in the enclosure-controller 14. The current variation is then read back by software via the I2C serial bus to perform a procedure corresponding to the ID. It is also feasible that the current variation of the hard disk 12 directly applies to the procedure of specifying the ID of each of the removable hard disk cases 10, thereby saving the step of using software for setting an ID. For instance, when the host 22 issues a read/write command to the hard disk 12 through software, the current variation of the hard disk 12 causes a corresponding pulse in the enclosure-controller 14. A counter in the enclosure-controller 14 counts the number of pulses due to current variation. If the command is issued to the first removable hard disk case 10 once, the value of the counter is 1, if the command is issued to the second removable hard disk case 10 twice, the value of the counter is 2, and so on. Software can change the value of the counter in each of the enclosure-controllers 14 from the number of times the command is issued to each of the removable hard disk case 10. The IDs can thus be set to let the value of each counter correspond to an ID, hence finishing specification of ID of each of the removable hard disk cases 10.

To sum up, in the present invention, a current sensor is used to detect the current variation when a hard disk idles and operates. The current variation is transformed into a voltage signal sent to a enclosure-controller. The enclosure-controller then converts the voltage signal into a flag. The host reads this flag via a serial bus to build the corresponding relations between several channels of a host and enclosure-controllers of several hard disks, thereby solving the problems of incorrect flashing light and incorrect removal of hard disk in the prior art due to ignorance of the relation between channels and enclosure-controllers. Moreover, the method of the present invention abandons manual assignment of IDs of enclosure-controllers of hard disks in the prior art, hence accomplishing the effects of easy use and friendly operation.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A hard disk device capable of detecting channels of a host to which hard disk controllers belong comprising:
    at least two hard disks used to store data and connected to a plurality of channels of a host;
    at least two enclosure-controllers each connected to one of said hard disks and used to control environmental parameters and accomplish interactive relationship of information transmission with said host;
    at least two current sensors each connected to one of said hard disks and one of said enclosure-controllers and used to detect current variation of said hard disk, transform the variation into a voltage signal and transmit the voltage signal to said enclosure-controller, said enclosure-controller then converting said voltage signal into a flag; and
    at least two serial buses each connected to one of said enclosure-controllers and providing connection with said host for processing communication protocols and data transmission of connection interface, said host reading said flag triggered by said enclosure-controller via said serial bus to build the corresponding relation between said channel connected to said hard disk and said enclosure-controller.

2. The hard disk device as claimed in claim 1, wherein each of said hard disks further comprises a read/write head.

3. The hard disk device as claimed in claim 1, wherein each of said enclosure-controllers has an ID.

4. The hard disk device as claimed in claim 1, wherein each of said enclosure-controllers is further connected to an indication lamp.

5. The hard disk device as claimed in claim 4, wherein said environmental parameters include temperature, voltage and said indication lamp.

6. The hard disk device as claimed in claim 1, wherein each of said enclosure-controllers compares said voltage signal with a voltage threshold to generate said flag.

* * * * *